United States Patent
Xu et al.

(10) Patent No.: US 9,607,364 B2
(45) Date of Patent: Mar. 28, 2017

(54) METHODS AND SYSTEMS FOR INVERSE TONE MAPPING

(71) Applicant: DOLBY LABORATORIES LICENSING CORPORATION, San Francisco, CA (US)

(72) Inventors: Ning Xu, Irvine, CA (US); Tao Chen, Palo Alto, CA (US); James E. Crenshaw, Burbank, CA (US); Timo Kunkel, Kensington, CA (US); Bongsun Lee, Cupertino, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/035,477

(22) PCT Filed: Nov. 19, 2014

(86) PCT No.: PCT/US2014/066394
§ 371 (c)(1),
(2) Date: May 9, 2016

(87) PCT Pub. No.: WO2015/077329
PCT Pub. Date: May 28, 2015

(65) Prior Publication Data
US 2016/0358319 A1    Dec. 8, 2016

Related U.S. Application Data

(60) Provisional application No. 61/907,996, filed on Nov. 22, 2013.

(51) Int. Cl.
*G06T 5/00* (2006.01)
*G06T 5/40* (2006.01)
(Continued)

(52) U.S. Cl.
CPC ............ *G06T 5/007* (2013.01); *G06T 5/40* (2013.01); *G06T 7/90* (2017.01); *H04N 1/4072* (2013.01);
(Continued)

(58) Field of Classification Search
CPC   G06T 5/007; G06T 5/40; G06T 7/408; G06T 2207/20208; H04N 1/6027
See application file for complete search history.

(56) References Cited

U.S. PATENT DOCUMENTS 7,983,496 B2   7/2011   Liu
7,995,855 B2   8/2011   Albu
(Continued)

FOREIGN PATENT DOCUMENTS

WO   2011/042229   4/2011
WO   2012/118961   9/2012
(Continued)

OTHER PUBLICATIONS

El-Mandy et al. ("High-quality HDR rendering technologies for emerging applications," IBM Journal of Research and Development ( vol. 54, Issue: 6, Nov.-Dec. 2010).*
(Continued)

*Primary Examiner* — Yubin Hung

(57) ABSTRACT

Novel methods and systems for inverse tone mapping are disclosed. A scene can be analyzed to obtain highlight detection from bright light sources and specular reflections. An inverse tone mapping curve can be calculated based on the lower dynamic range and higher dynamic range displays. Multi-scale filtering can be applied to reduce noise or artifacts.

18 Claims, 4 Drawing Sheets

(51) Int. Cl.
  *H04N 1/60* (2006.01)
  *H04N 1/407* (2006.01)
  *G06T 7/90* (2017.01)
(52) U.S. Cl.
  CPC . *H04N 1/6027* (2013.01); *G06T 2207/20016* (2013.01); *G06T 2207/20028* (2013.01); *G06T 2207/20208* (2013.01)

(56) References Cited

U.S. PATENT DOCUMENTS

| | | | |
|---|---|---|---|
| 8,014,445 B2 | 9/2011 | Segall | |
| 8,184,693 B2 | 5/2012 | Chiu | |
| 8,289,412 B2 | 10/2012 | Banterle | |
| 8,483,479 B2 | 7/2013 | Kunkel | |
| 2002/0110376 A1* | 8/2002 | MacLean | G03B 17/48 396/429 |
| 2006/0104508 A1* | 5/2006 | Daly | G06T 5/009 382/167 |
| 2010/0046612 A1 | 2/2010 | Sun | |
| 2010/0260260 A1 | 10/2010 | Wiegand | |
| 2010/0283861 A1* | 11/2010 | Tamagawa | G06T 5/007 348/222.1 |
| 2011/0019914 A1 | 1/2011 | Bimber | |
| 2011/0129148 A1* | 6/2011 | Kisilev | G06T 5/009 382/167 |
| 2011/0194618 A1 | 8/2011 | Gish | |
| 2011/0293003 A1 | 12/2011 | Luo | |
| 2011/0293013 A1 | 12/2011 | Ma | |
| 2011/0316973 A1 | 12/2011 | Miller | |
| 2012/0057803 A1 | 3/2012 | Wakazono | |
| 2012/0201456 A1* | 8/2012 | El-Mahdy | G06T 5/009 382/167 |
| 2012/0206470 A1* | 8/2012 | Frank | H04N 1/4078 345/581 |
| 2012/0256941 A1 | 10/2012 | Ballestad | |
| 2012/0328161 A1 | 12/2012 | Palenychka | |
| 2013/0004074 A1 | 1/2013 | Gish | |
| 2013/0076974 A1 | 3/2013 | Atkins | |
| 2013/0121572 A1* | 5/2013 | Paris | H04N 19/30 382/166 |
| 2013/0148029 A1 | 6/2013 | Gish | |
| 2013/0148907 A1 | 6/2013 | Su | |
| 2013/0328907 A1* | 12/2013 | Ballestad | H04N 1/6027 345/590 |
| 2014/0064632 A1* | 3/2014 | Manabe | G06T 5/00 382/254 |
| 2015/0070537 A1* | 3/2015 | Bai | H04N 9/735 348/251 |

FOREIGN PATENT DOCUMENTS

| | | |
|---|---|---|
| WO | 2012/122425 | 9/2012 |
| WO | 2012/125802 | 9/2012 |
| WO | 2012/142285 | 10/2012 |
| WO | 2013/039730 | 3/2013 |
| WO | 2013/046095 | 4/2013 |
| WO | 2013/090120 | 6/2013 |
| WO | 2013/112532 | 8/2013 |
| WO | 2015/061335 | 4/2015 |

OTHER PUBLICATIONS

McCann, J. ("The general solution to HDR rendering," Proc. SPIE. 8291, Human Vision and Electronic Imaging XVII, Feb. 9, 2012).*

Kuo et al. ("Content-adaptive inverse tone mapping," IEEE Visual Communications and Image Processing (VCIP), Nov. 27-30, 2012).*

Banterle, F. et al "Inverse Tone Mapping" ACM, New York, NY, USA, 2006, pp. 349-356.

Akyuz, A.O. et al "Do HDR Displays Support LDR Content" ACM Trans Graphic vol. 3, 2007, pp. 38.

Maylan, L. et al "The Reproduction of Specular Highlights on High Dynamic Range Displays" 14th Color Imaging Conference, 2006.

Remple, A.G. et al "Ldr2Hdr: on-the-fly Reverse Tone Mapping of Legacy Video and Photographs" ACM Transactions, vol. 3, 2007, pp. 39.

Kovaleski, R.P. et al "High-Quality Brightness Enhancement Functions for Real-Time Reverse Tone Mapping" The Visual Computer 25, Apr. 5-7, 2009, pp. 539-547.

Didyk, P. et al "Enhancement of Bright Video Features for HDR Displays" Computer Graphics Forum 27, 2008, pp. 1265-1274.

Banterle, F. et al "A Framework for Inverse Tone Mapping" The Visual Computer, vol. 23, No. 7, pp. 467-478, (2007).

Banterle, F. et al "A GPU-friendly Method for High Dynamic Range Texture Compression Using Inverse Tone Mapping" Proc. of Graphics Interface 2008, pp. 41-48.

Kunkel, T. Identifying Perceived Light source. Chapter 7 of PhD thesis "Colour Apperance Modelling for Digital Imaging Pipelines" (University of Bristol, 2010).

Masia, B. et al "Selective Reverse Tone Mapping" Proc. CEIG, 2010.

Masia, Belen et al "Evaluation of Reverse Tone Mapping Through Varying Exposure Conditions" ACM Transactions on Graphics, vol. 28, No. 5, Dec. 1, 2009, p. 1.

* cited by examiner

METHODS AND SYSTEMS FOR INVERSE TONE MAPPING

CROSS REFERENCE TO RELATED APPLICATIONS

This application claims priority to U.S. Provisional Patent Application No. 61/907,996 filed on 22 Nov. 2013, which is hereby incorporated by reference in its entirety.

TECHNICAL FIELD

The present disclosure relates to tone mapping. More particularly, it relates to methods and systems for inverse tone mapping.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
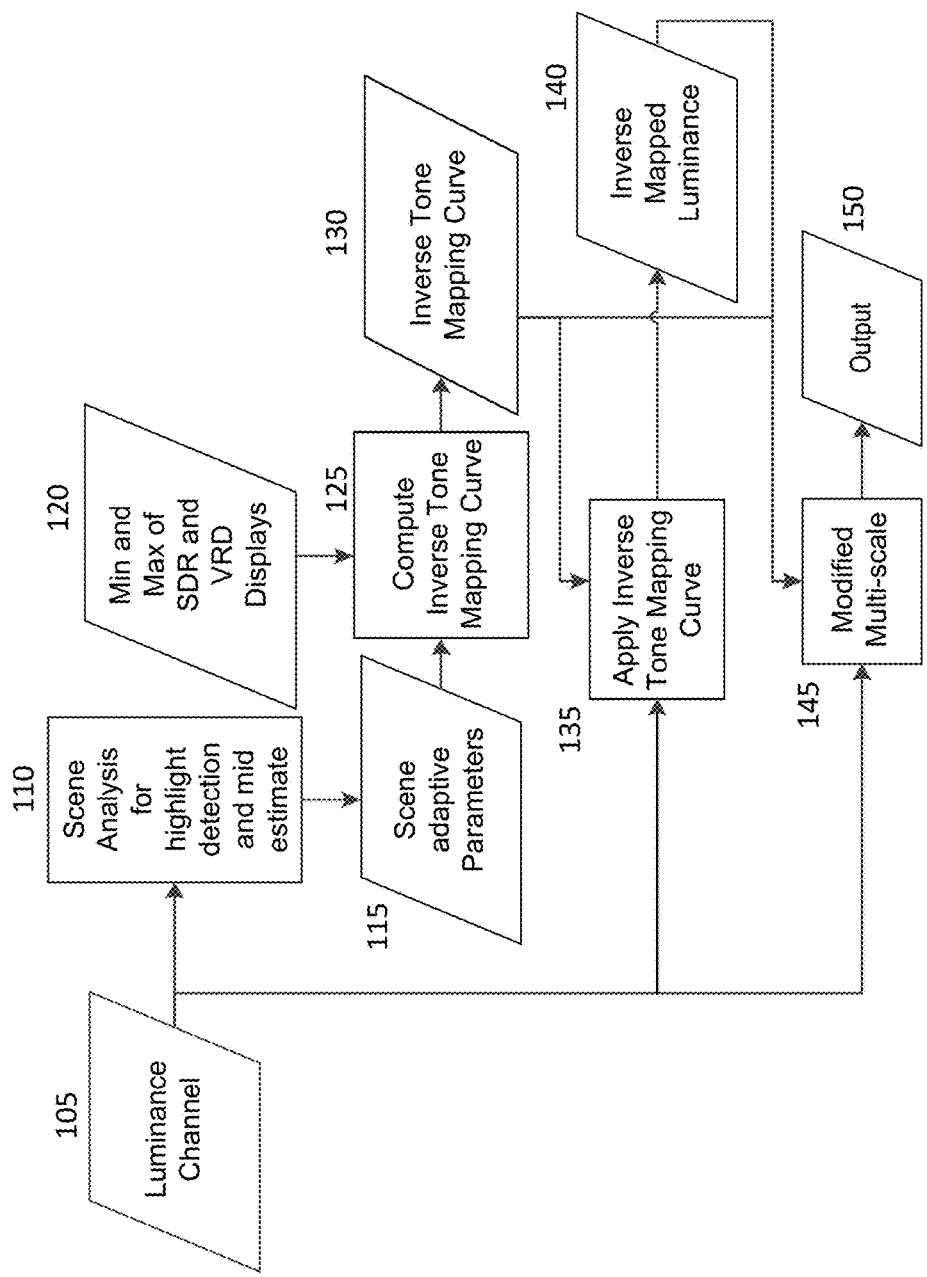
FIG. 1 illustrates an overview of one embodiment of the inverse tone mapping process of the present disclosure.

In a first aspect of the disclosure, a method to perform inverse tone mapping is described, the method comprising: providing, by a computer, a luminance of an image; detecting, by a computer, highlights in the luminance, thereby obtaining a highlight detection parameter; estimating, by a computer, a mid-value of the luminance, thereby obtaining a mid-value luminance parameter; providing, by a computer, minimum and maximum luminance values for a lower dynamic range display and for a higher dynamic range display; calculating, by a computer, an inverse tone mapping curve, based on the highlight detection parameter, the mid-value luminance parameter, and the minimum and maximum luminance values for the lower dynamic range display and the higher dynamic range display; and applying, by a computer, the inverse tone mapping curve to the luminance as a global mapping operator, thereby obtaining an inversely mapped luminance.

DETAILED DESCRIPTION

As used herein, the term 'dynamic range' (DR) may relate to a capability of the human visual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or ophthalmological sense) have an intensity range that spans about 15 orders of magnitude. Adapted humans may perceive dim light sources of a few photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the term 'visual dynamic range' (VDR) may relate to the DR that is simultaneously perceivable by a HVS. As used herein, VDR may relate to a DR that spans 5-6 orders of magnitude, however it is not intended to be limited to any span of dynamic range, and VDR may be narrower or equal to HDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR) or standard dynamic range (SDR), in relation to VDR and HDR. Digital cinema systems exhibit some of the same limitations as other display devices. In the present application, "visual dynamic range (VDR)" is intended to indicate any extended dynamic range, which is wider than LDR or SDR, and may be narrower or equal to HDR. A SDR image may, for example, be 48 nits cinema content or 100 nits Blu-ray content. VDR may also be expressed interchangeably, as EDR (Enhanced dynamic range). In general, the methods of the present disclosure relate to any dynamic range higher than SDR.

Advances in the underlying technology of digital cinema will allow future digital cinema systems to render image and video content with significant improvements in various quality characteristics over the same content, as rendered on today's digital cinema systems. For example, future digital cinema systems may be capable of a DR (e.g. VDR) that is higher than the SDR/LDR of conventional digital cinema systems as well as a larger color gamut than the color gamut of conventional digital cinema systems.

Herein and in the following, by "signal" a physical, electrical signal is intended, for example, a digital bitstream to represent an image or parameters related to image processing. Such signal (or image) processing can introduce a loss in image quality, one reason being the difference between the input signals used in the processing at the transmitting and receiving ends, respectively.

The present disclosure describes systems and methods for converting color graded standard dynamic range (SDR) content into a VDR (or EDR) content via inverse tone-mapping.

Displays that have higher dynamic range are now emerging in both professional and consumer electronics market. At the same time, most of the distributed content is still color corrected to a low dynamic range, for example, Blu-ray disks can be color graded to 100 nits. When the Blu-ray content, intended to be shown on 100 nits displays, is input directly to a higher dynamic range display, the visual perception of the content could be quite different from what was meant to be seen by the directors of the content, such as a movie.

Several embodiments are possible for the methods and systems of the present disclosure. For example, for VDR consumer devices, an inverse tone mapping module could be located, in some embodiments, after decoding of the SDR signal. Such inverse tone mapping module may convert the signal directly to the capacity of the VDR display.

In other embodiments, inverse tone mapping could be applied directly to convert the content of a catalog to a higher dynamic range. For example, companies like Vudu® or Amazon®, which have a vast digital catalog of content, could apply the algorithm directly to the content of their catalog.

In other embodiments, for example for live sports broadcasting, it could be possible that one of the cameras has a VDR range, while the others are SDR. For such cases, the inverse tone mapping can convert the output of the SDR cameras to match the dynamic range of the VDR camera.

In yet other embodiments, the methods and systems of the present disclosure may be applied together with other methods. For example, referring to U.S. Provisional Patent Application No. 61/894,382, "Guided Color Grading for Extended Dynamic Range", filed Oct. 22, 2013, the disclosure of which is incorporated herein by reference in its entirety, the inverse tone mapping methods and systems of the present disclosure could serve as an initial guess of VDR color grading.

There are several methods in the literature for performing inverse tone mapping so that the standard dynamic range image/video can be converted to high dynamic range for targeted high dynamic range display.

One possible difficulty of inverse tone mapping lies in the manipulation of highlight pixels, including the pixels of light sources and specular reflections. One category of inverse tone mapping methods consists in literally inverting tone mapping operators, so that different global tone mapping operators can yield different inverse tone mappers. Such an approach is described, for example, in Banterle et al., *Inverse tone mapping*, Graphite '06, 2006, ACM, pp. 349-356, the disclosure of which is incorporated herein by reference in its entirety.

A group of methods known in the literature use a simple linear expansion. However, such methods would not perform well for all contents without distinguishing light source/specular reflection from diffusive reflection. For example, for an input image of a 100 nits display, the white pixels could be either from a light source or from a diffusive white paper. As understood by the person skilled in the art, by applying global tone mapping these 100 nits white pixels will usually be mapped to very high brightness, for example, 4000 nits in a VDR display. Such mapping could be correct for those pixels that come from a bright light source. However, if the pixels are instead diffusive pixel, then mapping to the same high luminance in the VDR display would likely not yield an image of good quality.

Another group of inverse tone mapping methods can treat highlights in different ways, by either masking out the highlight locations spatially, or by labeling the bright areas into different categories to be handled in a specific way. This group of methods could solve the ambiguity of how to map the bright pixels in order to obtain a good quality image, by treating the pixels in different ways. However, the spatial separation of different kinds of pixels can be error prone and introduce more complexity in the computational algorithm.

In the methods proposed in the present disclosure, a first step comprises detecting whether a scene or frame contains any highlights, including highlights originating from bright light sources and those originating from specular reflections. Based on the results of such detection, the inverse tone mapping curves can be adjusted or optimized. Therefore, the inverse tone mapping curve is still a global curve, but it is adaptively modified based on the specific content.

Other possible difficulties in inverse tone mapping are boosting of noises, over-shooting, and the appearance of quantization bandings in smoothly changing areas, especially in the high luminance range. In the present disclosure, modified multi-scale methods are described that could reduce these artifacts which are due to the expansion of dynamic range in an image or video.

Regarding the generation of a tone mapping curve for display management, an example algorithm is described in PCT Patent Application with Ser. No. PCT/US2012/029189, "Method and Apparatus for Image Data Transformation," filed on Mar. 15, 2012, to be referred from now on as the '189 Application, which is incorporated herein by reference in its entirety.

In the DM algorithm, the minimum and maximum luminance values of the source and target displays are taken into account, together with a mid-value calculated from the input content VDR, and the mid-value it will be mapped to. These three pairs of values determine three control points on the tone mapping curve. Similarly in inverse tone mapping, these three control points are first determined. For the middle control point, there is an SDR input mid-value estimated from the input SDR signal, based on which it is possible to find out where in the VDR output range this mid value of SDR input should be mapped to. In one embodiment, this mid value in EDR can be estimated based on the relative location of the mid SDR value in the SDR range. For the end control point in the dark side, it is possible to use the minimum luminance values of the source and target displays, while on the bright side, it is possible to use the concept of a virtual source display to determine the control points. The virtual source display can have the same minimum luminance as the real source display, but a different maximum luminance, depending on whether there are highlight regions in the content.

If there is no light source, or no specular reflection in the content, it can be possible to add some virtual highlights at a higher luminance level, and show the content on a virtual source display, which has a higher maximum luminance than the real source display. The imaginary virtual highlights can then be removed from the content, in order to be able to see the same content showing on a real source display. The maximum luminance value of the virtual source display can be used to compute the tone mapping curve, instead of the real source display. Therefore, the tone mapping curve can be affected by the maximum luminance value of the virtual source display, which is in turn determined by the probability of whether the scene contains any light source.

When the three pairs control points are determined, parameters c1, c2, c3 can be calculated as in the DM algorithm in the '189 Application. Once c1, c2, and c3 are calculated, in an embodiment, a VDR value may be computed as $$VDR = \frac{SDR^n - c1}{(c2 - c3 \cdot SDR^n)^{\frac{m}{n}}}$$

where in one embodiment, n=3, m=$r^{(1/4)}$, and r is ratio of the perceptual dynamic range of VDR over SDR.

In addition, to maintain the temporal consistency of the inverse tone mapping methods, the input content can be processed scene by scene, e.g., the inverse tone mapping curve can be determined based on the content in each scene. In some embodiments, it may not be possible to process the input content scene by scene. In such embodiments, when real-time conversion is required, a recursive filtering can be applied to the parameters for determining the inverse tone mapping curve, to avoid abrupt changes of the tone mapping curves in consecutive frames.

FIG. 1 illustrates an overview of one embodiment of the inverse tone mapping process of the present disclosure.

In the embodiment of FIG. 1, inverse tone mapping can be applied to the luminance channel (105) only. A scene analysis (110) is performed for highlight detection and mid-value estimation. This step (110) will provide two parameters (115): 1) a probability of whether the scene contains highlight, and 2) the mid value of the luminance. These two content-dependent parameters (115), together with the parameters of both SDR and VDR displays (120), can be used to compute an inverse tone mapping curve (125). The computed inverse tone mapping curve (130) can then be applied as a global tone mapping operator (135) to each pixel in the scene, obtaining an inverse mapped luminance channel (140). In a subsequent step (145), a modified multi-scale process (145) can be applied to handle any boosted noise and quantization bands, obtaining a final output (150).

In the embodiment of FIG. 1, the method is scene-based. However, a frame by frame method may also be employed. When processing content frame by frame, it may be necessary to apply recursive filtering to the adaptive parameters for the scene (for example, calculated for each frame), in order to avoid abrupt changes in consecutive frames.

Recursive filtering may be performed as follows. For example, considering a parameter p, the parameter used in a previous frame is $P_{i-1}$, while the newly calculated parameter in current frame i is $p_i$, to obtain a parameter $P_i$ to be used in current frame, a weight w can be defined, so that $P_i=(1-w)*P_{i-1}+w*p_i$. In some embodiments, the weight w can have a range of [0,1] and can be tuned as needed. When the weight becomes 1, the process becomes a frame by frame process.

Referring to FIG. 1, the scene analysis step (110) may be performed as follows.

Scene Analysis: Highlight Detection and Mean Luminance

Scene analysis will yield two scene-dependent parameters: highlight detection and mean luminance. The first parameter is the probability of whether the scene contains highlights, including light sources and specular reflections, and the second parameter is the mid-value of the input luminance.

Highlight Detection

Many methods on detecting highlights can be applied. For example, the method described in Meylan et al., *The reproduction of specular highlights on high dynamic range displays*, IS&T/SID 14$^{th}$ Color Imaging Conference (2006); Kunkel, T., *Identifying perceived light source*. Chapter 7 of PhD thesis "*Colour Appearance Modelling for Digital Imaging Pipelines*" (University of Bristol, 2010); and "Light detection, color appearance models, and modifying dynamic range for image display", U.S. Pat. No. 8,483,479 B2, the disclosure of all of which is incorporated by reference in their entirety. The output of the highlight detection methods above can be easily converted into a probability of whether the scene contains highlights.

In one embodiment, the dark channel information is used to estimate the probability of a highlight. The dark channel is the lowest value of the three color components for each pixel. Statistically, a diffuse pixel of natural images usually has low intensity in at least one of the three color channels. To estimate the probability of a highlight, the maximum value of the dark channel is obtained, and two thresholds $T_1$ and $T_2$ are defined, for the maximum dark channel value. If the maximum dark channel value is greater than $T_1$, the probability of a highlight is set to 1; if the maximum dark channel value is less than $T_2$, the probability of a highlight is set to 0; and if the maximum dark channel value is between $T_1$ and $T_2$, the probability of a highlight is linearly interpolated between 0 and 1, depending on the maximum dark channel value.

In some embodiments, heuristic criteria can be applied, based on the statistics, including skewness and kurtosis of the dark channel value distribution in high luminance range, to determine the probability of existence of a light source and specular reflections.

In other embodiments, perception-based highlight detection can be applied, to separate areas in images that are likely to be perceived as emissive (e.g. light sources, specular highlights) versus areas that are perceived as being reflective (objects, surfaces, textures, . . . ). The outcome of such an analysis is not only a function of the intensity (e.g. pixel value) but also takes into account the size of a region under analysis.

A multi-scale approach can also be used, decomposing the image into separate spatial frequency layers using image pyramids. An example of a multi-scale approach is described in the '189 Application. In another embodiment, in each layer, the gradients towards lighter pixels are identified using a set of Difference of Gaussian Kernels (DoG). These layers are then weighted and recombined. The last step involves bilateral filtering forming an interims map depicting areas that are likely to be perceived as light sources. As this approach was designed for still images the following extension can be applied for video-based inverse tone mapping.

If it is possible to pre-analyze a scene:

a. Compute temporal statistics (e.g. weighting predictors) for all temporally parallel layers (e.g. all pyramid layers x for all frames in the scene). In this way, a statistical indicator can be obtained on how many frames of highlights of a particular size are present.

b. After averaging the weighting predictors of each frame, it is possible to create a temporarily global (and thus stabilized) weighting scheme for recombining the pyramid layers which would otherwise globally affect the tone mapping.

The method of above steps a. and b. can allow alleviation of the 'glowing wedding dress problem'. This problem can be described with the example of a white reflective object such as a bride's dress, where the object is the main element in a scene, and subsequently the camera zooms out. After zooming out the white reflective object might be detected as glowing. The highlight detection method aims at solving this problem, in order to not suddenly detect the wedding dress as glowing, upon a change in the scene such as a zoom-out.

If it is not possible to pre-analyze a scene, then the temporal analysis as described above in steps a. and b. can be carried out as a temporal, scene-cut aware, low-pass dampening of the weighting scheme (no sudden changes in detection of light sources inside a scene).

Further, the identified highlight pixels can be grouped and/or clustered together to form highlight pixels areas even if they are not connected morphologically (e.g. reflections on a water surface). This method can be used to track highlight pixels throughout a scene spatially, as well as temporally and through image pyramid layers (highlight area). Such tracking can be carried out even if the highlight pixels temporally change intensity or size. The tracking can stabilize the impact of the highlight pixels on the inverse tone mapping.

Mean Luminance

The second parameter is the mid-value of the input luminance, which is estimated as the mean luminance value in one embodiment. The mean luminance value can be estimated from an entire scene or from single frames. For example, the mean luminance can be estimated from an entire scene for the case of offline processing, or from single frame for the case of frame-based processing. In another embodiment, a weighted average of the luminance can be calculated from the input SDR content, while different weights can be assigned to different pixels, according to their luminance value, or their local spatial temporal properties. One method for assigning weights comprises calculating the mid value for the luminance based on the luminance histogram. Another method is based on the saliency detection results, i.e., putting more weight at those places that are considered more important in the scene.

Calculating the Tone Mapping Curve

In one embodiment, sigmoid curves may be used for calculating a tone mapping curve—see for example the '189 Application. In other embodiments, any other monotonic tone mapping curve may be employed. The methods of the present disclosure describe how to change the monotonic tone mapping curve based on the scene analysis results.

As described for example in the '189 Application, three parameters of the statistics of a scene luminance can be used to determine the shape of the curve, e.g., the minimum, mid-level, and maximum. In one embodiment, the mid-level of the input SDR content is obtained, and this value can be used to estimate a mid-value for the VDR content. The mid-value for the VDR content can then be used to determine the shape of the tone mapping curve, together with the min and max of the target VDR display luminance.

In other words, among the three parameters, two of them, min and max, can be fixed according to the VDR display, and the mid can be estimated from the mid value of the SDR content.

In one embodiment, the mid value of SDR can be calculated as the mean value of the luminance of the scene, while the mid of the VDR scene is linearly scaled up from the mid of the SDR scene, according to the dynamic ranges of the VDR and SDR displays.

The probability $P_{highlight}$ of whether the SDR content, containing highlights, can be used to determine the maximum luminance of virtual source display $S'_{max}$. In one of the embodiment, $$S'_{max}=S_{max}+c^*(1-P_{highlight})^*S_{max}$$

where $S_{max}$ is the maximum luminance of the real source display, e.g, the SDR display, and c is a constant to tune how much higher the max luminance of virtual source display should be. After calculating $S'_{max}$, a tone mapping curve can be generated that maps the min luminance of the VDR display $T_{min}$ to the min luminance of SDR display $S_{min}$, and maps the max luminance of VDR display $T_{max}$ to the max luminance of the virtual source display $S'_{max}$.

Modified Multi-Scale

Regular multi-scale processes can be applied to a mapping, or such processes may be modified as described in the present disclosure. The following example relates to a mapping from SDR to VDR. Without multi-scale, VDR=map (SDR). Different types of multi-scale filters can be chosen, for instance: a Gaussian filter, a bilateral filter, a guided filter, or any other edge-preserving filters. Without loss of generality, as an example not intended as a limitation, the MSF notation will be used in the following to represent any multi-scale filter.

When multi-scale is applied, the equation for mapping, above, becomes:

$$VDR=map(MSF(SDR))+(SDR-MSF(SDR))$$

which indicates that the SDR is first filtered by the MSF filter, subsequently mapped to VDR, and then the difference between SDR and the MSF filtered SDR is added back to the output.

The result can be approximated by changing the order between the map operator and MSF, to obtain $$VDR=SDR+MSF(map(SDR)-SDR).$$

The high frequency residue of MSF can keep the same magnitude instead of being expanded by the SDR to EDR mapping. Effectively, this step can reduce the boosted noise, over shooting, and also remove the quantization bandings being boosted by the inverse tone mapping.

However, applying this multi-scale scheme for inverse tone mapping can also blur the details in the input SDR image. The boosted artifacts can happen more frequently when the mapping slope is very high, for example in the high luminance range. From this observation, two schemes can be applied to modify the multi-scale so that the multi-scale will remove the boosting of noises in that range and maintain sharpness of the content.

By slope, the slope of the tone mapping curve at the luminance value of a pixel is intended.

In the first scheme, the slope of the inverse tone mapping curve can be used to blend the original tone mapping results and the multi-scale results. In one embodiment, two thresholds can be defined for the slope of the inverse tone mapping curve. For pixels with a slope less than the first threshold, the original tone mapping results can be used; for pixels with slope greater than the second threshold, the multi-scale results can be used; and for pixels with a slope in between the two thresholds, the two results (original tone mapping and multi-scale) can be linearly interpolated.

The slope of the inverse tone mapping curve can be monotonically related to the pixel luminance value within the high luminance range. Therefore, in another embodiment, two thresholds can be further applied for the pixels' luminance, and subsequently a soft-switching process can be applied, similar to that detailed above. Such soft-switching can be based on the pixels' luminance values. For example, for each pixel, a weight w can be determined, within a range of [0,1], according to its luminance value or the corresponding slope of the inverse tone mapping curve, such that the modified result $$VDR'=w^*VDR+(1-w)^*map(SDR)=w^*map(SDR)+w^*MSF(map(SDR)-SDR)+(1-w)^*map(SDR)=map(SDR)+w^*MSF(map(SDR)-SDR)$$

In the second scheme, in order to modify the regular multi-scale method, a second mapping function map2 can be introduced and applied to the residue, so that for modified multi-scale, $$VDR=map(MSF(SDR))+map2(SDR-MSF(SDR))$$

This second modified multi-scale scheme can enable the capability of handling the high frequency part of an image in a different way. In one embodiment, function map2 can be very similar to the tone mapping function map, while having a limited slope at the high end.

Figure 2:
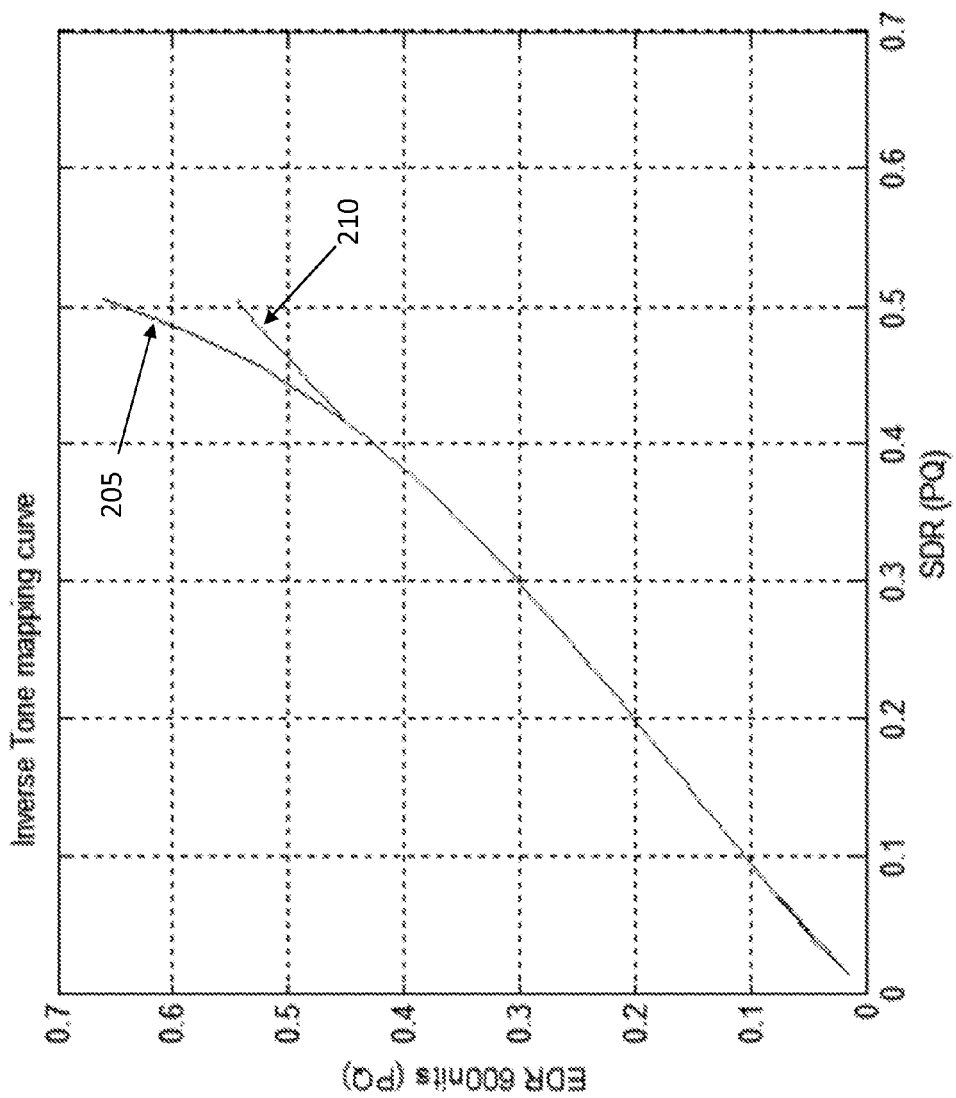
FIG. 2 illustrates examples of inverse tone-mapping functions according to an embodiment of the present disclosure.

An example is shown in FIG. 2, where the curve (205) represents an example of a map function, while the curve (210) represents an example of a map2 function. Applying the same approximation as above, $$VDR=map2(SDR)+MSF(map(SDR)-map2(SDR)).$$

As can be seen in FIG. 2, curve (205) has a higher slope at the high end, compared to curve (210).

This scheme can be generalized to multiple map functions, for example, $$VDR=map(MSF1(SDR))+map2(MSF2(SDR))+map3(MSF3(SDR))$$

where $$SDR=MSF1(SDR)+MSF2(SDR)+MSF3(SDR))$$

In other words, the SDR signal can be decomposed to different components and these different components can be mapped using different mapping functions.

Figure 3:
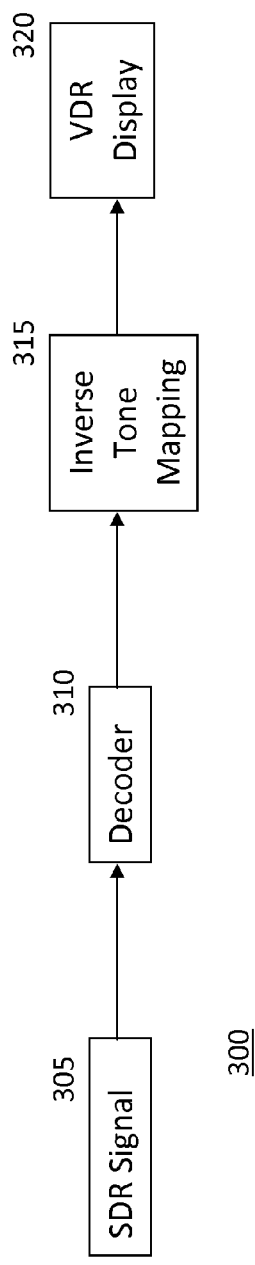
FIG. 3 illustrates an exemplary embodiment for an inverse tone mapping module.

In some embodiments, the inverse tone mapping process may be implemented in a hardware module in a system. For example, FIG. 3 illustrates an exemplary embodiment for an inverse tone mapping module (315) in a system (300), where a SDR signal (305) is at first decoded by a decoder (310), and subsequently is input to an inverse tone mapping module (315), which then outputs to a VDR display (320).

Figure 4:
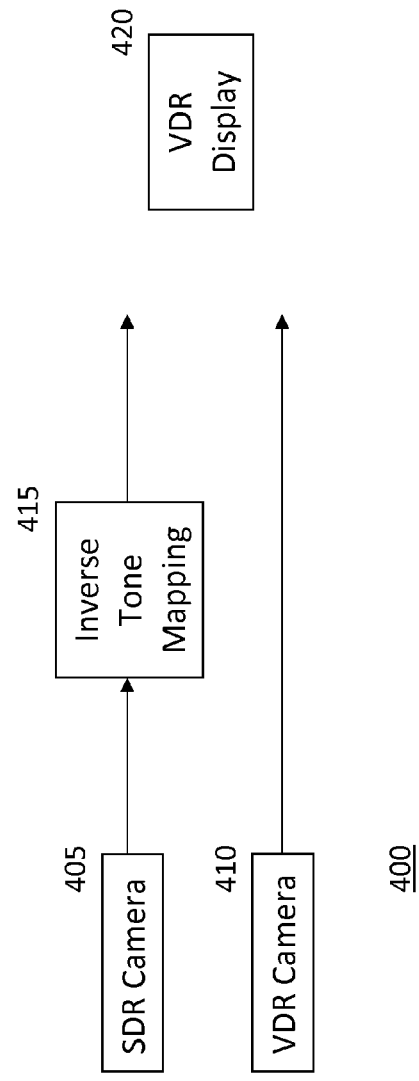
FIG. 4 illustrates another exemplary embodiment for an inverse tone mapping module.

In other embodiments, the inverse tone mapping process may also be implemented in a hardware module in a system. For example, FIG. 4 illustrates an exemplary embodiment for an inverse tone mapping module (415) in a system (400). The system (400) comprises a VDR camera (410) and a SDR camera (405). The SDR camera (405) transmits an SDR signal to the inverse tone mapping module (415), whose output is then sent to a VDR display. The output of the VDR camera (410) is also ultimately sent to a VDR display (420). As understood by the person skilled in the art, additional modules may be present. For example, encoding and decoding modules for transmission of the signals may be present. The signals may be images or videos.

Figure 5:
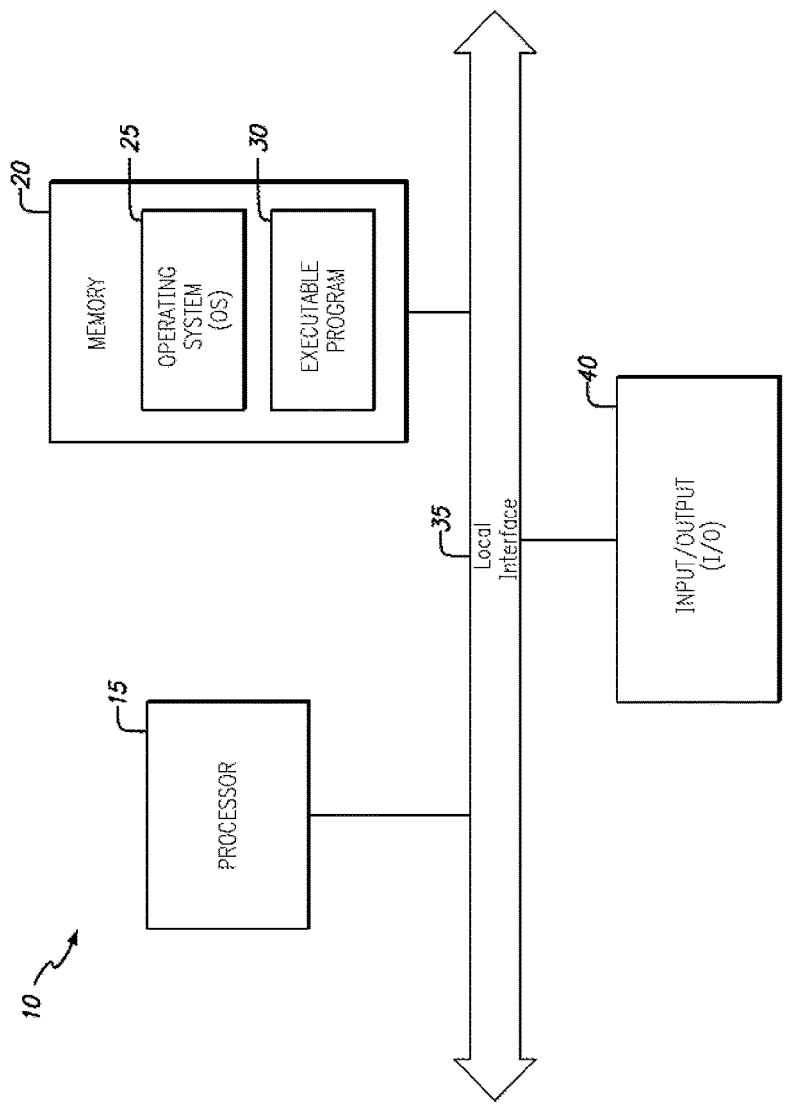
FIG. 5 depicts an exemplary embodiment of a target hardware for the implementation of an embodiment of the present disclosure.

FIG. 5 is an exemplary embodiment of a target hardware (10) (e.g., a computer system) for implementing the embodiment of FIGS. 1 to 4. This target hardware comprises a processor (15), a memory bank (20), a local interface bus (35) and one or more Input/Output devices (40). The processor may execute one or more instructions related to the implementation of FIGS. 1 to 4, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 5. In some embodiments a plurality of processors may be used in a parallel configuration for added execution speed. In such a case, the executable program may be specifically tailored to a parallel execution. Also, in some embodiments the processor (15) may execute part of the implementation of FIGS. 1 to 4, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method to perform inverse tone mapping, the method comprising:
providing, by a computer, a luminance of an image;
detecting, by a computer, highlights in the luminance, thereby obtaining a highlight detection parameter;
estimating, by a computer, a mid-value of the luminance, thereby obtaining a mid-value luminance parameter;
providing, by a computer, minimum and maximum luminance values for a lower dynamic range display and for a higher dynamic range display;
calculating, by a computer, an inverse tone mapping curve, based on the highlight detection parameter, the mid-value luminance parameter, and the minimum and maximum luminance values for the lower dynamic range display and the higher dynamic range display; and
applying, by a computer, the inverse tone mapping curve to the luminance as a global mapping operator, thereby obtaining an inversely mapped luminance.

2. The method of claim 1, wherein the detecting highlights comprises detecting highlights from brighter light sources and from specular reflections.

3. The method of claim 1, wherein the detecting highlights comprises estimating a probability of highlighted pixels in the image.

4. The method of claim 1, wherein the highlight detection parameter and the mid-value luminance parameter are scene-adaptive.

5. The method of claim 1, wherein the image is a frame in a video.

6. The method of claim 5, further comprising recursive filtering between adjacent frames in the video.

7. The method of claim 1, wherein the lower dynamic range display or the higher dynamic range display is a virtual display, and wherein the virtual display has a different maximum luminance value from a corresponding source display.

8. The method of claim 7, further comprising:
adding, by a computer, virtual highlights to a luminance of the image, wherein the virtual highlights have a higher luminance level than a luminance level of the virtual display;
displaying, by a computer, the image with virtual highlights on the virtual display; and
removing, by a computer, the virtual highlights.

9. The method of claim 1, wherein the detecting highlights is based on a dark channel information and two threshold values.

10. The method of claim 1, wherein the detecting highlights is based on heuristic criteria, perception-based criteria, or a multi-scale approach.

11. The method of claim 1, wherein the calculating comprises:
obtaining, by a computer, a mid-value luminance of a lower dynamic range image; and
estimating, by a computer, a mid-value luminance of a higher dynamic range image, based on the mid-value luminance of the lower dynamic range image.

12. The method of claim 1, further comprising applying a multi-scale filter to the inversely mapped luminance, thereby obtaining a filtered inversely mapped luminance.

13. The method of claim 12, wherein the multi-scale filter comprises a Gaussian filter, a bilateral filter, or a guided filter.

14. The method of claim 12, further comprising blending, by a computer, the inversely mapped luminance with the filtered inversely mapped luminance, thereby obtaining a blended inversely mapped luminance.

15. The method of claim 14, wherein the blending comprises:
defining, by a computer, a first threshold parameter and a second threshold parameter, wherein the second threshold parameter is greater than the first threshold parameter;
iterating, by a computer, between pixels of the image, wherein the iterating is for at least one pixel and wherein the iterating executes one of the following steps
 i. if a slope of the inverse tone mapping curve at a luminance value of the at least one pixel is less than the first threshold parameter, the blending for the at least one pixel considers only the inversely tone mapped luminance for the at least one pixel;
 ii. if a slope of the inverse tone mapping curve at a luminance value of the at least one pixel is more than the second threshold parameter, the blending for the at least one pixel considers only the filtered inversely mapped luminance for the at least one pixel; or
 iii. if a slope of the inverse tone mapping curve at a luminance value of the at least one pixel is more than the first threshold parameter and less than the second threshold parameter, the blending for the at least one pixel is linearly interpolated between the inversely tone mapped luminance and the filtered inversely mapped luminance for the at least one pixel.

16. The method of claim 15, wherein the image comprises high frequency luminance pixels, the high frequency luminance pixels having frequencies higher than a fixed value and wherein the method further comprises mapping of the high frequency luminance pixels separately.

17. A system comprising:
a decoder, configured to receive an encoded lower dynamic range image or video and output a decoded lower dynamic range image or video;
an inverse tone mapping module, configured to receive the decoded lower dynamic range image or video and output an inversely tone mapped image or video, wherein the inverse tone mapping is carried out according to the method of claim 1.

18. A system comprising:
at least one lower dynamic range camera, configured to output a lower dynamic range image or video;
at least one higher dynamic range camera, configured to output a higher dynamic range image or video;
an inverse tone mapping module, configured to receive the lower dynamic range image or video and output an inversely tone mapped image or video, wherein the inverse tone mapping is carried out according to the method of claim 1;
a higher dynamic range display, configured to receive the higher dynamic range image or video and the inversely tone mapped image or video.

* * * * *